(12) United States Patent
Blubaugh et al.

(10) Patent No.: US 6,509,733 B2
(45) Date of Patent: Jan. 21, 2003

(54) FLUID CYLINDER WITH EMBEDDED POSITIONING SENSOR

(75) Inventors: James F. Blubaugh, Peoria, IL (US);
Hans P. Dietz, Naperville, IL (US);
Wayne W. Lark, Joliet, IL (US); David
J. McIntyre, Plainfield, IL (US);
Thomas G. Skinner, Aurora, IL (US);
Sean P. Wiltz, Oak Forest, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/741,989

(22) Filed: Dec. 20, 2000

(65) Prior Publication Data
US 2002/0074994 A1 Jun. 20, 2002

(51) Int. Cl.$^7$ ................................. G01B 7/14
(52) U.S. Cl. ........................ 324/207.13; 324/207.24; 92/5 R
(58) Field of Search ................. 324/207.12, 207.13, 324/207.22, 207.24, 220; 91/1; 92/5 R

(56) References Cited

U.S. PATENT DOCUMENTS

| | | | |
|---|---|---|---|
| 3,898,555 A | | 8/1975 | Tellerman |
| 4,552,055 A | | 11/1985 | Foxwell |
| 4,632,018 A | * | 12/1986 | Lymburner ............... 92/5 R |
| 4,718,647 A | * | 1/1988 | Ludwig ................ 267/64.11 |
| 4,771,866 A | * | 9/1988 | Heideman et al. ......... 188/1.11 |
| 4,788,489 A | | 11/1988 | Kobayashi et al. |
| 4,952,873 A | | 8/1990 | Tellerman |
| 4,961,055 A | | 10/1990 | Habib et al. |
| 5,150,049 A | | 9/1992 | Schultz |
| 5,182,980 A | * | 2/1993 | Greer ..................... 92/5 R |
| 5,198,761 A | * | 3/1993 | Hashimoto et al. .... 324/207.12 |
| 5,320,325 A | | 6/1994 | Young et al. |
| 5,514,961 A | | 5/1996 | Stoll et al. |
| 5,583,433 A | | 12/1996 | Sawa |
| 5,717,330 A | | 2/1998 | Moreau et al. |
| 5,952,823 A | * | 9/1999 | Nyce et al. ............ 324/207.13 |
| 5,977,778 A | | 11/1999 | Chan et al. |
| 5,998,992 A | | 12/1999 | Arai |

FOREIGN PATENT DOCUMENTS

| | | |
|---|---|---|
| DE | 23 13 215 A | 6/1974 |
| DE | 91 09 062 U | 9/1991 |

OTHER PUBLICATIONS

Hydro–Line, Inc. HLT–II –Encapsulated Linear Position Sensing System (1996) (Attachment 1).

* cited by examiner

Primary Examiner—Edward Lefkowitz
Assistant Examiner—Darrell Kinder
(74) Attorney, Agent, or Firm—Haverstock, Garrett & Roberts; Steven M. Hanley

(57) ABSTRACT

The present fluid cylinder includes a cylinder body having a cylindrical internal cavity therein with a longitudinal axis therethrough, the internal cavity being adapted for disposition of a piston and rod assembly for axial movement therein. The cylinder includes a member such as an end cap enclosing an axial end of the internal cavity, the member having a sensor port or passage therethrough extending between an internal opening communicating with the internal cavity and an external opening. A sensor is disposed in the internal opening of the sensor port or passage, and a sensor electronics module is disposed therein between the sensor and the external opening. The sensor is operable for sensing an axial distance of the piston or the rod from a predetermined location when disposed in the internal cavity and outputting signals representative of the distance to the sensor electronics module which includes circuitry for retrieving the signals.

23 Claims, 4 Drawing Sheets

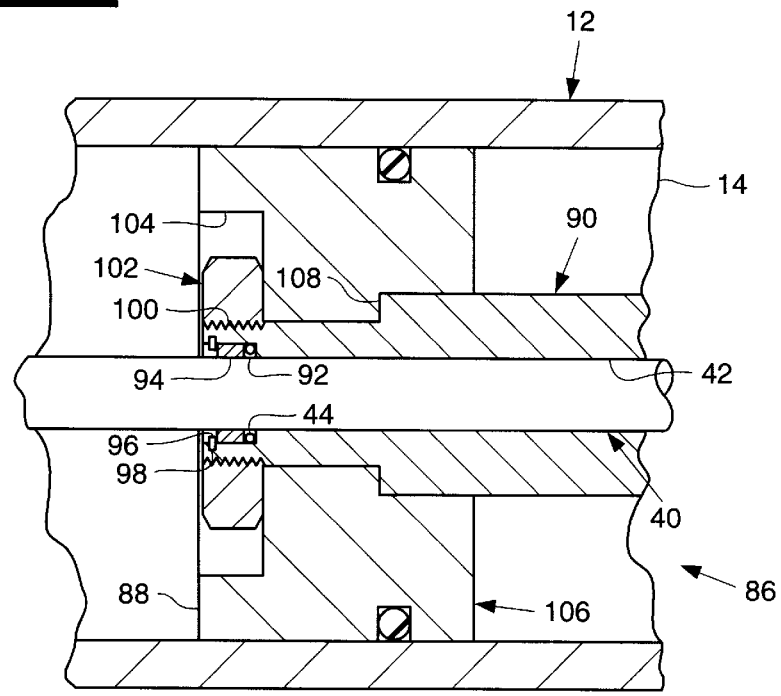
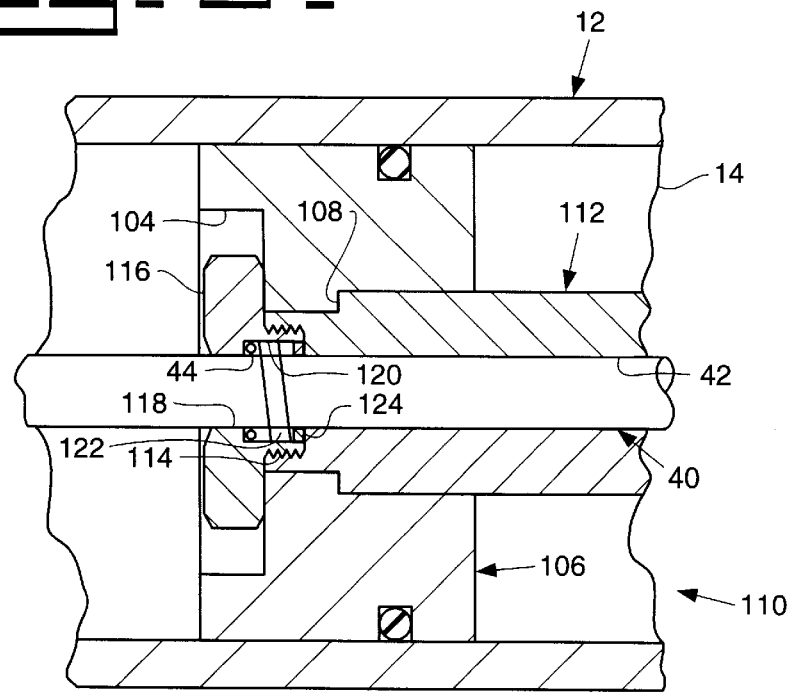

FLUID CYLINDER WITH EMBEDDED POSITIONING SENSOR

TECHNICAL FIELD

This invention relates generally to a fluid cylinder such as a hydraulic or a pneumatic cylinder or the like, and more particularly, to a fluid cylinder including an embedded sensor and sensor electronics module for determining positional information for a rod of the cylinder.

BACKGROUND ART

Known linkage systems utilizing fluid cylinders for changing link length and angular orientation typically utilize controls wherein information relating to the length and/or velocity of movement of one or more cylinder rods is required. The electrical aspects of control apparatus for such systems typically require the use of a variety of sensors, including, but not limited to, lever position sensors and linkage position sensors, and also utilize electro-hydraulic valves and an onboard electronic control module operable for executing a control strategy for linkage movement. A central portion of such control strategies is typically a linkage position input which can be embodied, for instance, in positional and/or velocity information for a cylinder rod. Such positional and velocity information is typically collected by a position sensor mounted on or in a subject fluid cylinder or on a linkage and through the linkage kinematics one can translate linkage angle into cylinder length. Reliable data collection from such sensors has been found to be largely dependent on the ability to maintain the integrity of such sensors and the conductive element or other path of communication between the sensor and the system under adverse operating and environmental conditions, such as heat, cold, dust, dirt, and contact with rocks and other objects that can damage the sensor and/or its path of communication with other elements of the control system.

Currently, to reduce the potential for damage to sensors from such operating and environmental factors, the sensors themselves are sometimes located within the cylinder housing or body. Reference in this regard, Chan et al. U.S. Pat. No. 5,977,778 issued Nov. 2, 1999 to Case Corporation of Racine, Wisconsin, which discloses a method and apparatus for sensing piston position including a transmitter/receiver unit mounted on a cylinder housing in communication with an internal cavity thereof for sensing position of a piston of the cylinder and communicating via a conductive path to circuitry located externally to the cylinder for processing the signal data and generating an output signal representative of the piston position. Reference also Tellerman U.S. Pat. No. 4,952,873 issued Aug. 28, 1990 to MTS Systems Corporation of Eden Prairie, Minn. which discloses a compact head, signal enhancing magnetostrictive transducer mounted on a mounting head positionable in a tank, cylinder or the like for sensing a piston position or liquid level, which transducer is connected via one or more conductive paths to electronic circuitry for providing output signals indicative of a displacement. However, known systems such as these have been found to provide only a partial solution to the problems encountered as electronic components required for the operation of the sensors and transducers thereof are still located externally to the cylinder so as to still be subjected to the adverse operating and environmental factors.

Accordingly, the present invention is directed to overcoming one or more of the problems as set forth above.

DISCLOSURE OF THE INVENTION

In one aspect of the present invention, a fluid cylinder is disclosed which includes a cylinder body including a cylindrical internal cavity therein having a longitudinal axis therethrough, the internal cavity being adapted for disposition of a piston and rod assembly for axial movement therein. The cylinder includes a member such as an end cap enclosing an axial end of the internal cavity, the member having a sensor port or passage therethrough extending between an internal opening communicating with the internal cavity and an external opening, a sensor disposed in the internal opening of the sensor port, and a sensor electronics module disposed in the sensor port between the sensor and the external opening, the sensor being connected to the sensor electronics module by a conductive element and being operable for sensing an axial distance of the piston or the rod from the sensor or a predetermined location and outputting signals representative of the distance along the conductive element to the sensor electronics module, the sensor electronics module including circuitry for receiving the signals, determining an axial position of the piston or the rod from the signals, and outputting a position signal representative of the axial position of the piston or the rod.

In one preferred aspect of the invention, the sensor is a magnetostrictive type sensor and includes a pressure pipe extending into the internal cavity in position to be cooperatively received telescopically within an axial passage extending into or through the rod. According to another preferred embodiment of the invention, the internal opening of the sensor port includes a central portion which is offset radially from the axis of the internal cavity and the pressure pipe has a longitudinal axis which is offset from a central portion of the sensor such that the pressure pipe is coaxial with the cavity and can be received in the passage of the rod. Additionally, the end cap member of the cylinder includes a fluid port extending therethrough to an axially facing opening beside the internal opening of the sensor port.

According to another preferred aspect of the invention, the sensor electronics module and the sensor, with the exception of the magnetostrictive element located in the pressure pipe, are contained within a unitary sensor housing. Alternatively, the sensor electronics module can be separately housed and located in or adjacent the external opening of the sensor port to facilitate removal and replacement.

BRIEF DESCRIPTION OF THE DRAWINGS

For a better understanding of the present invention, reference may be made to the accompanying drawings in which:

FIG. 5 is a fragmentary sectional view of a fluid cylinder including a piston and rod assembly according to the present invention having a magnet mounted in the end of the rod therein and a pressure pipe of a magnetostrictive sensor extending therethrough for interactive operation therewith;

FIG. 6 is a fragmentary cross-sectional view of a fluid cylinder including another piston and rod assembly according to the present invention therein having a magnet mounted within an end of a bolt which holds the piston onto the rod.

BEST MODE FOR CARRYING OUT THE INVENTION

Figure 1:
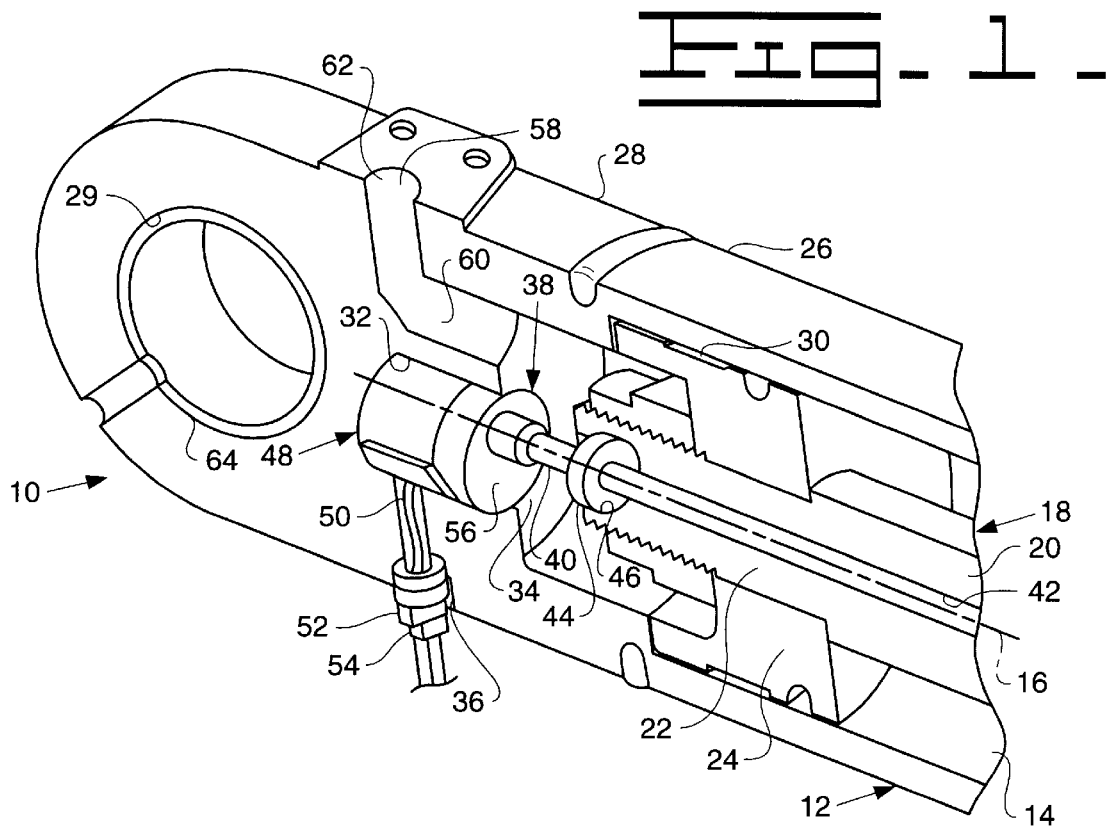
FIG. 1 is a fragmentary cutaway perspective view of a fluid cylinder constructed and operable according to the present invention, including a sensor port having an offset internal opening in which a sensor and sensor electronics module are disposed.

Referring now to the drawings, wherein several preferred embodiments of fluid cylinders constructed and operable according to the teachings of the present invention are shown, FIG. 1 shows a fluid cylinder 10 including a cylinder body 12 having a cylindrical internal cavity 14 therein. Internal cavity 14 has a longitudinal axis 16 extending therethrough. A piston and rod assembly 18 is disposed in internal cavity 14 for axial movement therein and includes a rod 20 having an axial end 22 connected to a piston 24, and an opposite axial end which extends outwardly from cylinder body 12 (not shown) in the conventional manner. It is recognized that the piston and rod assembly 18 could be a ram member wherein the end of the rod/ram portion is the piston. These types of cylinders are single acting cylinders having pressurized fluid introduced only to the head end thereof. Cylinder body 12 includes an axial end 26 having an end cap member 28 with a pin hole 29 conventionally mounted or otherwise disposed thereon which encloses a corresponding axial end 30 of internal cavity 14. End cap member 28 has a sensor port 32 therethrough extending between an internal opening 34 communicating with internal cavity 14, and an external opening 36.

A sensor 38 is disposed in internal opening 34 of sensor port 32. Sensor 38 shown is a conventionally operable magnetostrictive type sensor typically used for determining the position of an object such as piston and rod assembly 18 relative to another object or location, and includes a pressure pipe 40 mounted thereto and extending axially into internal cavity 14. Pressure pipe 40 is cooperatively telescopically received within an axial passage 42 extending into and through at least a substantial portion of rod 20. Pressure pipe 40 contains a conventionally constructed and operable magnetostrictive element or waveguide (not shown) that interacts with an annular magnet 44 mounted in an axial counterbore 46 in the rod 20.

Briefly, the waveguide consists of a wire connected to sensor 38 and extending through pressure pipe 40, sensor 38 being operable for generating current pulses which are sent through the wire. Magnet 44 extends around pressure pipe 40 and has a magnetic field which interacts with the current pulse causing a torsional pulse in the waveguide which is transmitted as a torsional strain wave that has a time period and which is reflected back to sensor 38. The torsional strain wave is sensed by a mode converter or other conventional sensor element in sensor 38 which generates an output signal. This output signal is then communicated to a sensor electronics module 48 which compares the strain wave to the time of launch of the current pulse causing the torsional strain wave and determines the distance to magnet 44 from the converter. The sensor electronics module 48 determines the time interval between the application of the current pulse and the reception of the torsional strain wave by the converter or other sensor element to indicate the position of the magnet and outputs a position signal representative thereof. Sensor electronics module 48 is connected via a conductive path 50 such as a metallic wire or the like, to a connector 52 mounted in external opening 36 of sensor port 32. Connector 52 is adapted for cooperative engagement with a connector plug 54 which can be connected via a conductive path such as a wire or the like to a wiring harness leading to a control module of a linkage system which includes fluid cylinder 10, for conveying the output signal from sensor electronics module 48 thereto.

Sensor electronics module 48 in this embodiment is shown mounted in internal opening 34 rearwardly of but directly abutting or adjacent to sensor 38. This location of sensor 38 and sensor electronics module 48 effectively embeds those items in cylinder 10 which provides certain advantages, among which is the protection provided from environmental conditions including, but not limited to, moisture, dirt, dust, and contact with objects that can damage module 48 such as rocks and the like. Another advantage is that the conductive path connecting module 48 with sensor 38 is relatively short and also effectively embedded and protected, such that external signal noise which can interfere with the torsional strain wave pulse is minimized, it being well known that such signals can be difficult to discriminate from external interference noise, even with advanced circuitry. External noise interference, however, is not generally a problem in relation to typical position signals outputted by the sensor electronics module.

Internal opening 34 of sensor port 32 has a central portion 56 which is offset in a radial direction by a predetermined amount from longitudinal axis 16 of internal cavity 14. In turn, pressure pipe 40, which is connected to the sensor 38, is radially offset from central portion 56 by a corresponding amount so as to be located coaxially with internal cavity 14. The sensor 38 is secured in its installed position by, for example, a groove and set screw arrangement 39 (FIG. 2) wherein the groove is on the sensor and a set screw is disposed within the end cap member 28. This aligns pressure pipe 40 with axially extending passage 42 in rod 40 to facilitate the telescopic relationship between pressure pipe 40 and piston and rod assembly 18. This also provides space on an opposite side of longitudinal axis 16 for a fluid port 58 to have an axially facing opening 60 in communication with internal cavity 14 for the flow of fluid therein and therefrom, with adequate wall thickness between sensor port 32 and opening 60 and also between the sensor port 32 and the pin hole 29 to maintain structural integrity of the end cap member 28 under pressurized conditions. Fluid port 58 includes opposite end having an external opening 62 connectable in fluid communication with a fluid line in the conventional manner. Fluid cylinder 10 additionally includes a bushing 64 located in a hole extending transversely through end cap member 28 for receiving a pin for connection with other elements of a linkage system, rod 20 including a rod eye at the opposite end thereof (not shown) for the same purpose.

Figure 2:
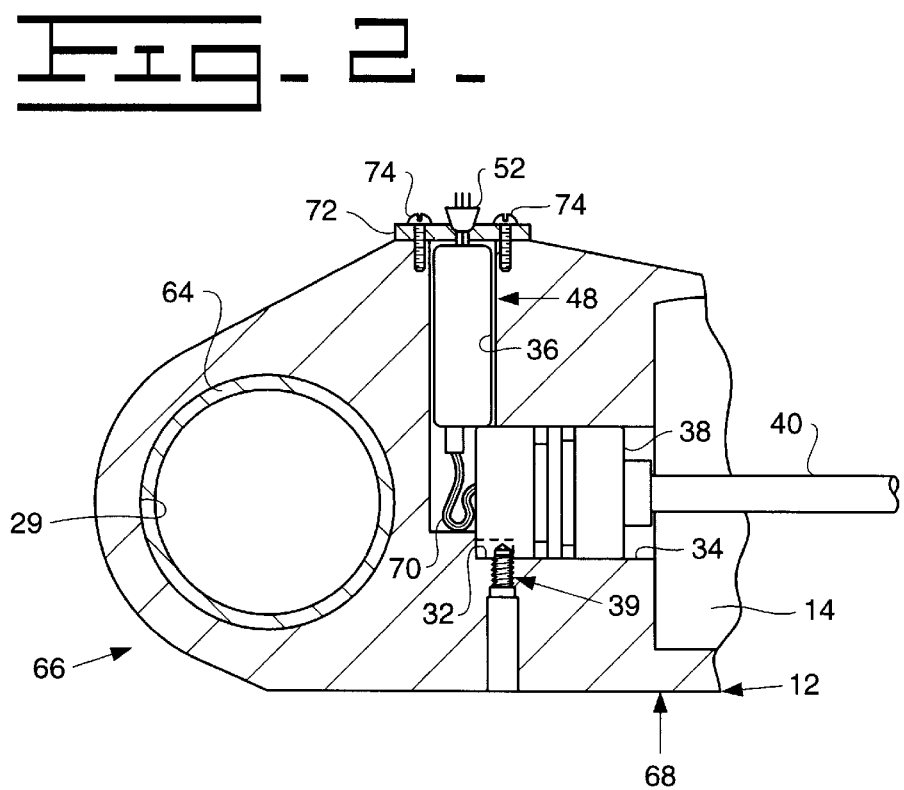
FIG. 2 is a fragmentary cross-sectional view of another fluid cylinder constructed and operable according to the present invention, including a sensor port having a sensor disposed in an internal opening thereof and a sensor electronics module in an external opening thereof.

Turning to FIG. 2, another fluid cylinder 66 constructed and operable according to the teachings of the present invention is shown, like parts of fluid cylinder 66 and fluid cylinder 10 being identified by like numerals. Fluid cylinder 66 includes a cylinder body 12 including an internal cavity 14 having a longitudinal axis 16 therethrough and adapted for receiving a piston and rod assembly 18 for axial movement therein, as shown in FIG. 1. Fluid cylinder 66 additionally includes an end cap member 68 enclosing one end of internal cavity 14. End cap member 68 includes a sensor port 32 extending therethrough between an internal opening 34 communicating with internal cavity 14 and an external opening 36. A sensor 38 is securely mounted in internal opening 34 of sensor port 32 and again is represented by a magnetostrictive type sensor including a pressure pipe 40 which extends into internal cavity 14 for telescopic receipt in axially extending passage 42 in or through rod 20 (FIG. 1). However, sensor electronics module 48 is securely mounted in a portion of sensor port 32 adjacent external opening 36 instead of near internal opening 34, sensor electronics module 48 being connected to sensor 38 for receiving the output signals therefrom via a conductive path 70 which can be a metallic wire or other conductive element. Sensor electronics module 48 is maintained in position and sealed from the outside environment in sensor port 32 by a cover plate 72 which encloses external opening 36 and is held in place by screws 74 threadedly engaged in holes in end cap member 68. A connector 52 extends through an opening in cover plate 72 and is connected in electrical communication with module 48 by suitable conductive path for outputting the position signals therefrom when connected to a mating connector such as connector 54 (FIG. 1). Sensor 38 and sensor electronics module 48 located and effectively embedded in sensor port 32 covered by cover plate 72 are protected from adverse environmental conditions and contact with potentially damaging rocks and the like, and conductive path 70 is protected from external noise which can adversely affect the signals conveyed therethrough. As an additional advantage, because cover plate 72 is removable, sensor electronics module 48 can be easily removed through opening 36 and replaced for maintenance and service, as required.

Figure 3:
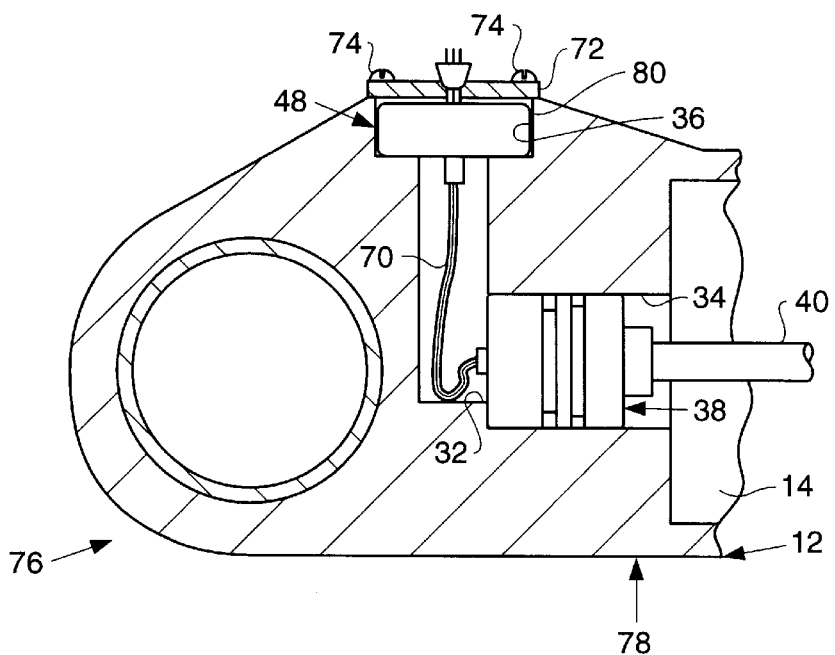
FIG. 3 is a fragmentary sectional view of another fluid cylinder of the present invention, including a sensor port having a sensor disposed in an internal opening thereof and a sensor electronics module disposed in an external opening thereof.

In FIG. 3, another fluid cylinder 76 is shown which is constructed and operable according to the teachings of the present invention, like parts of fluid cylinder 76 and fluid cylinders 66 and 10 being identified by like numbers. Fluid cylinder 76 again includes a cylinder body 12 including an internal cavity 14 for receiving a piston and rod assembly 18 (FIG. 1) for axial movement therein, and is enclosed on one end by an end cap member 78. End cap member 78 includes a sensor port 32 extending therethrough between an internal opening 34 communicating with internal cavity 14 and an external opening 36. A sensor 38, again represented by a magnetostrictive type sensor, is disposed or mounted in internal opening 34 and includes a pressure pipe 40 which extends into internal cavity 14 for telescopic receipt in piston and rod assembly 18. In this embodiment, external opening 36 includes a counterbore 80 or other enlargement in which sensor electronics module 48 is disposed and retained by a cover plate 72 held in place by screws 74. A conductive path 70, again which can be a metallic wire or other conductive element extends through sensor port 32 and connects sensor 38 with module 48, this location protecting conductive path 70 from electronic noise and environmental conditions. Sensor electronics module 48 is thus similarly effectively embedded in port 32 in cylinder 12 and protected by end cap member 78 and cover plate 72, this location allowing easy removal and replacement for maintenance and service. Module 48 is connected to a connector 52 by a conductive path for connection to a control module of a linkage or steering system, as described above.

Figure 4:
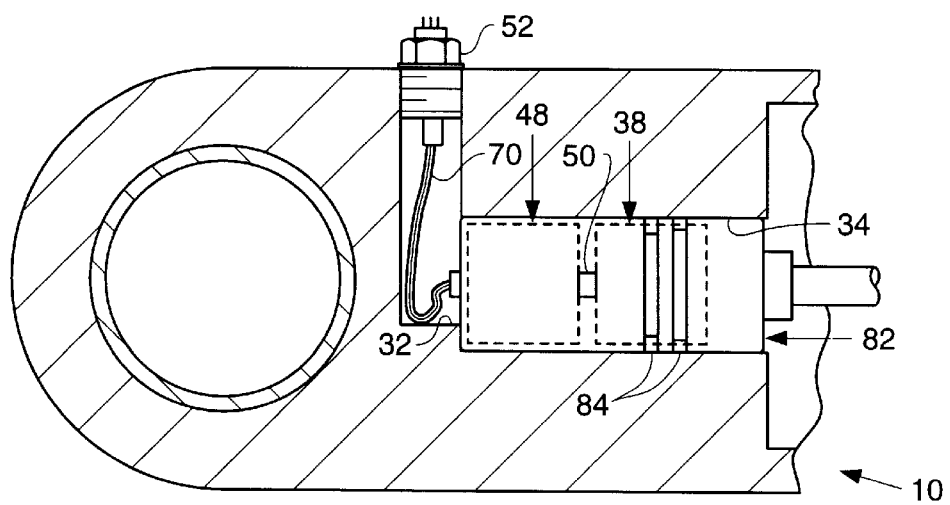
FIG. 4 is a fragmentary sectional view of the fluid cylinder of FIG. 1 including an integral sensor and sensor electronics module disposed in the internal opening of the sensor port thereof.

FIG. 4 shows fluid cylinder 10 with sensor 38 and sensor electronics module 48 jointly contained and protected within a sensor housing 82 disposed in internal opening 34 of sensor port 32 and connected by a conductive path 70 to a connector 52 mounted in external opening 36. This construction provides additional protection for the conductive path 50 which connects sensor 38 and module 48 while allowing removal and replacement for maintenance and service from the internal cavity 14. Sensor housing 82 and the other housings described above for sensor 38 include annular grooves 84 therearound for receiving O-rings or other seal members (not shown) for providing a sealed condition around internal opening 34 to prevent penetration of fluid from internal cavity 14 into sensor port 32 past the sensor 38.

Referring again to FIG. 1, piston and rod assembly 18 is shown with piston 24 is abutment with a flange around end cap member 28 which establishes the maximum distance of travel of piston and rod assembly 18 in the direction toward that end cap member. However, for some applications, it is desirable to increase the possible distance of travel toward end cap member 28. To facilitate this desired increased travel distance, internal opening 34 of sensor port 32 can be of sufficient depth in the axial direction such that sensor 38, as well as sensor electronics module 48 when located in opening 34, can be more fully received or recessed in the opening, as shown in FIGS. 2 and 3.

Additionally, or alternatively, the piston and rod assembly used can be constructed so as to be capable of being positioned closer and even in abutting relation to the end cap of the cylinder and/or the body or housing of a sensor, such as the sensor 38.

For instance, referring to FIG. 5, one alternative piston and rod assembly 86 is shown disposed for axial movement within an internal cavity 14 of a representative cylinder body 12, like parts of piston and rod assembly 86 and assembly 18 being identified by like numbers. Piston and rod assembly 86 mainly differs from assembly 18 by having a substantially flush or near flush axial end 88. Here, a rod 90 of assembly 86 includes an axially extending passage 42 through at least a portion thereof, passage 42 being adapted for receiving pressure pipe 40 of a magnetostrictive sensor, such as that shown in FIGS. 1–4. Passage 42 includes a counterbore 92 which receives magnet 44 located around pressure pipe 40, an annular spacer 94 which also extends around pressure pipe 40, and a retainer ring 96 seated in an annular groove 98 extending around counterbore 92 for retaining spacer 94 and magnet 44 in counterbore 92. Rod 90 further includes an external threaded portion 100 extending around the end thereof containing counterbore 92 which is threadedly engaged by a nut 102 located in an optional large counterbore 104 in the end of a piston 106 of piston and rod assembly 86. Nut 102 holds piston 106 in position on the end of rod 90 against a shoulder 108 extending therearound. Piston and rod assembly 86, by virtue of the flushness or flatness of axial end 88 thereof is thus capable of receiving pressure pipe 40 to such an extent as to be located in abutment with a sensor, such as sensor 38, to allow a greater extent of travel of the piston and rod assembly.

Referring to FIG. 6, another alternative piston and rod assembly 110 is shown in an internal cavity 14 of a cylinder body 12 of a representative fluid cylinder, like parts of piston and rod assembly 110 and piston and rod assemblies 18 and 86 being identified by like numerals. Piston and rod assembly 110 includes a rod 112 having an axially extending passage 42 extending into or therethrough adapted for telescopically receiving a pressure pipe, such as pressure pipe 40 shown. Rod 112 includes a shoulder 108 therearound for abutment with a piston 106 which is retained in place by a bolt 116 threadedly engageable with a threaded counterbore 114. Bolt 116 has an axial passage 118 therethrough adapted for receiving pressure pipe 40, passage 118 including a counterbore 120. Magnet 44 is located in counterbore 120 and maintained in position therein by a compression spring 122 and a washer 124, both of which also extend around pressure pipe 40. Bolt 116 is also shown located in an optional counterbore 104 in piston 106. Again, because the end of piston and rod assembly 110 is substantially flat or flush or near flush, it is able to be positioned in abutment or closely adjacent to a sensor, such as sensor 38, to allow a greater degree of travel for usage of a greater portion of internal cavity 14 of the cylinder.

Figure 7:
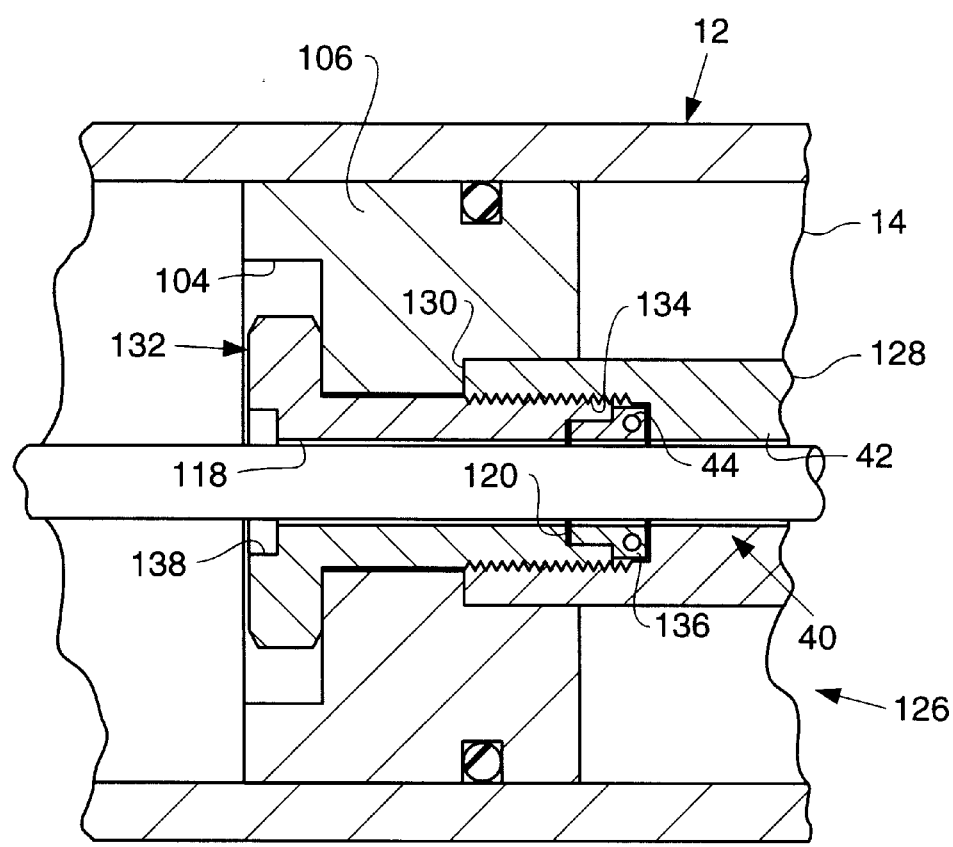
FIG. 7 is a fragmentary cross-sectional view of a fluid cylinder including another piston and rod assembly according to the present invention therein having a magnet mounted in the end of a bolt used to secure the piston to the rod.

Referring to FIG. 7, another alternative piston and rod assembly 126 is shown in the internal cavity 14 of the cylinder body 12 of a representative fluid cylinder, like parts of piston and rod assembly 126 and piston and rod assemblies 18, 86 110 being identified by like numerals. Piston and rod assembly 126 includes a rod 128 having the axially extending passage 42 extending into or therethrough adapted for telescopically receiving a pressure pipe, such as pressure pipe 40 shown. Rod 128 includes an end surface 130 for abutment with the piston 106 which is retained in place by a bolt 132 threadedly engageable with a threaded counterbore 134 within the end of the rod 128. Bolt 132 has the axial passage 118 therethrough adapted for receiving pressure pipe 40, passage 118 including a counterbore 120 at one end thereof for receiving a carrier member 136 having the magnet 44 disposed therein. Bolt 132 is also shown located in the optional counterbore 104 in piston 106. Again, because the end of piston and rod assembly 126 is substantially flat or flush or near flush, it is able to be positioned in abutment or closely adjacent to a sensor, such as sensor 38, to allow a greater degree of travel for usage of a greater portion of internal cavity 14 of the cylinder. A counterbore 138 is disposed in the other end of the bolt 132 to provide clearance, if needed, for an end portion of the sensor 138.

Industrial Applicability

The fluid cylinders of the present invention are adapted for use with a wide variety of sensors of different sizes, shapes and types in addition to the magnetostrictive sensors shown and discussed hereinabove used for determining piston and rod assembly position relative to the end cap 28, as well as for other purposes. The sensors disposed or embedded in the sensor port or passage of the cylinder, as well as the sensor electronics module, can have a wide variety of different shapes and sizes, and can be securely mounted in the sensor port or passage, using, for instance, frictional engagement, adhesives, and/or conventional mechanical fasteners and the like. Similarly, the present invention is contemplated for use with a wide variety of fluid cylinder constructions in addition to those disclosed and illustrated herein, including cylinders having a wide variety of different port configurations and locations, as well as different means for attachment to a linkage system.

Other aspects, objects and advantages of the present invention can be obtained from a study of the drawings, the disclosure and the appended claims.

What is claimed is:

1. A fluid cylinder, comprising:
   a cylinder body including a cylindrical internal cavity therein having a longitudinal axis therethrough, the internal cavity being adapted for disposition of a piston and rod assembly for axial movement therein;
   a member enclosing an axial end of the internal cavity, the member having a sensor port therethrough extending between an internal opening communicating with the internal cavity and an external opening; and
   a sensor disposed in the internal opening of the sensor port, and a sensor electronics module being encased within a portion of the fluid cylinder not including the piston and rod assembly, the sensor being connected to the sensor electronics module by a conductive element and being operable for sensing an axial distance of the piston or the rod from the sensor or a predetermined location and outputting a signal representative of the distance along the conductive element to the sensor electronics module, the sensor electronics module including circuitry for receiving the signal, determining an axial position of the piston or the rod therefrom, and outputting a position signal representative of the axial position of the piston or the rod.

2. The fluid cylinder of claim 1, wherein the rod includes an axially extending passage therein having an axial opening positioned for communication with the internal cavity when the rod is disposed therein, and the sensor includes a magnetostrictive element disposed in a pressure pipe extending into the internal cavity in position to be cooperatively received telescopically within the passage of the rod.

3. The fluid cylinder of claim 2, wherein the internal opening of the sensor port includes a central portion which is offset in a radial direction by a predetermined amount from the axis of the internal cavity and the pressure pipe has a longitudinal axis which is offset from a central portion of the sensor so as to be positioned coaxially with the cavity, the end member additionally including a fluid port extending therethrough to an axially facing opening beside the internal opening of the sensor port.

4. The fluid cylinder of claim 1, wherein the sensor and the sensor electronics module are contained within a unitary sensor housing.

5. The fluid cylinder of claim 1, wherein the sensor electronics module is disposed in the sensor port adjacent to the external opening thereof, and the external opening is covered by a cover plate.

6. The fluid cylinder of claim 1, wherein the sensor electronics module is disposed in the internal opening of the sensor port adjacent to the sensor.

7. The fluid cylinder of claim 1, further comprising a conductive element connected to the sensor electronics module for carrying the position signal outputted thereby, and a connector for connection to a wiring harness or other element of a control system for outputting the position signal thereto.

8. The fluid cylinder of claim 2 further comprising the piston and rod assembly, the piston and rod assembly comprising a rod including a passage therein or therethrough for telescopically receiving the pressure pipe of the sensor and a magnet around the passage in position for interaction with the magnetostrictive element disposed in the pressure pipe.

9. The fluid cylinder of claim 8 wherein the piston and rod assembly has a substantially flush end including an element for retaining the piston and the magnet thereon.

10. A piston and rod assembly, comprising:
   a rod having an axial passage and an opening at one end adapted for telescopically receiving a sensor element;
   a piston having first and second axial ends, the rod extending from a first axial end of the piston and the second axial end including a surface adapted for abutment;
   an element interactive with the sensor element positionable in or in close proximity to the opening, and a retaining element, the element interactive with the sensor element being retained in position by the retaining element; and a piston retaining element, the piston being retained on the rod adjacent to said end of said rod, wherein the retaining element and the piston retaining element being recessed within the second axial end of said piston.

11. The piston and rod assembly of claim 10, wherein the element for retaining the element interactive with the sensor element and the element for retaining the piston comprise a bolt having a passage therethrough for receiving the sensor element.

12. The piston and rod assembly of claim 10, wherein the element retaining the element interactive with the sensor element comprises a retainer ring receivable in a groove around the opening.

13. The piston and rod assembly of claim 12, wherein the element for retaining the piston comprises a nut threadedly engageable with the end of the rod.

14. The piston and rod assembly of claim 10, wherein the elements for retaining the element interactive with the sensor element and for retaining the piston are both disposed in a counterbore in the piston.

15. A fluid cylinder, comprising:
a cylinder body including a cylindrical inner cavity having a longitudinal axis therethrough;
a member enclosing an axial end of the internal cavity, the member having a sensor port therethrough extending between an internal opening communicating with the internal cavity and an external opening;
a piston and rod assembly disposed for axial movement in the internal cavity of the cylinder body and including an axial passage extending therein or therethrough; and
a magnetostrictive sensor mounted in the internal opening of the sensor port and having a pressure pipe extending into the internal cavity of the cylinder body and telescopically received in the passage in the rod, a magnet mounted on the rod in proximity to the pressure pipe, and a sensor electronics module being encased within a portion of the fluid cylinder not including the piston and rod assembly, the sensor being operable for sensing an axial distance of the magnet from the sensor and outputting a signal representative of the distance to the sensor electronics module, the sensor electronics module including circuitry for receiving the signal, determining an axial position of the piston or the rod therefrom, and outputting a position signal representative of the axial position of the piston or rod.

16. The fluid cylinder of claim 15, further comprising a connector connected to the sensor electronics module for receiving the position signal outputted therefrom.

17. The fluid cylinder of claim 15, wherein the magnet is disposed in a counterbore in the end of the rod.

18. The fluid cylinder of claim 15, wherein the magnet is retained by a bolt which also retains the piston on the rod.

19. A cylinder assembly comprising;
a cylinder and a piston and rod assembly reciprocally disposed within said cylinder, said cylinder including an end portion sealably enclosing an end thereof; and
a position sensor assembly operative to sense a position of said piston and rod assembly and generate an output signal indicative of said position, said position sensor assembly comprising:
a sensor electronics module encased in said end portion of said cylinder;
a sensor portion in electrical communication with said sensor electronics module, said sensor portion being configured to register a position of the piston and rod assembly relative said cylinder.

20. The cylinder assembly of claim 19, wherein the sensor electronics module includes a portion thereof adapted to be exposed to fluid within said cylinder.

21. The cylinder assembly of claim 19, wherein the sensor electronics module is encapsulated within a sensor housing and said sensor portion is fixedly mounted within said sensor housing.

22. The cylinder assembly of claim 21, wherein said sensor portion is at least partially extended into a passage within a rod of said piston and rod assembly.

23. The cylinder assembly of claim 22, wherein said sensor portion is positioned adjacent the sensor electronics module.

* * * * *